United States Patent
Ko

(10) Patent No.: US 8,350,828 B2
(45) Date of Patent: Jan. 8, 2013

(54) TOUCH SCREEN APPARATUS WITH REFLECTOR

(75) Inventor: Chun-Cheng Ko, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 415 days.

(21) Appl. No.: 12/649,521

(22) Filed: Dec. 30, 2009

(65) Prior Publication Data
US 2010/0259506 A1    Oct. 14, 2010

(30) Foreign Application Priority Data
Apr. 8, 2009  (CN) .......................... 2009 1 0301423

(51) Int. Cl.
*G06F 3/042* (2006.01)
(52) U.S. Cl. ........................................ 345/175; 345/176
(58) Field of Classification Search .......... 345/168–176, 345/1.3, 39, 156–158; 178/18.01, 19.01; 607/88, 94; 356/375
See application file for complete search history.

(56) References Cited

U.S. PATENT DOCUMENTS

| | | | | |
|---|---|---|---|---|
| 4,896,662 A * | 1/1990 | Noble | ............................. | 606/94 |
| 5,220,409 A * | 6/1993 | Bures | ............................. | 356/621 |
| 5,525,764 A * | 6/1996 | Junkins et al. | ............. | 178/18.01 |
| 5,786,810 A * | 7/1998 | Knox et al. | .................... | 345/168 |
| 6,256,023 B1 * | 7/2001 | Yano et al. | ..................... | 345/177 |
| 2003/0216795 A1 * | 11/2003 | Harth et al. | ..................... | 607/88 |
| 2005/0078095 A1 * | 4/2005 | Ung et al. | ..................... | 345/175 |
| 2006/0109199 A1 * | 5/2006 | Yee et al. | ........................ | 345/1.3 |
| 2006/0227113 A1 * | 10/2006 | Joyce et al. | ..................... | 345/173 |
| 2007/0236454 A1 * | 10/2007 | Ung et al. | ..................... | 345/158 |
| 2008/0029316 A1 * | 2/2008 | Jaeger et al. | ............. | 178/19.01 |
| 2008/0042993 A1 * | 2/2008 | Jaeger et al. | .................. | 345/173 |
| 2008/0134562 A1 * | 6/2008 | Teetzel | ............................. | 42/146 |
| 2008/0278460 A1 * | 11/2008 | Arnett et al. | .................. | 345/175 |
| 2011/0163998 A1 * | 7/2011 | Goertz et al. | ................. | 345/175 |

* cited by examiner

*Primary Examiner* — Prabodh M Dharia
(74) *Attorney, Agent, or Firm* — Altis Law Group, Inc.

(57) ABSTRACT

An exemplary touch screen apparatus comprises a display screen, a first reflector, a first infrared light source, and an infrared light receiving unit. The display screen includes a display area. The first reflector is disposed outside said display screen and surrounds the display area. The first reflector has a first focal point, and the first infrared light source is disposed on the first focal point. The infrared light receiving unit is capable of receiving the infrared light from the display screen.

8 Claims, 6 Drawing Sheets

TOUCH SCREEN APPARATUS WITH REFLECTOR

BACKGROUND

1. Technical Field

The present disclosure relates to touch screen apparatus, and particularly, to a touch screen apparatus with a reflector.

2. Description of Related Art

Liquid crystal display (LCD) is used to display images for computers, TVs, MP3 players, mobile phones, video phones, and so on. With rapid developments and applications of the information technology, wireless mobile telecommunication, ways of controlling these devices are changed from buttons, traditional keyboards to touch screens based on LCD, so as to satisfy requirements of convenience and user friendly operations. Currently, various touch screens are used, including, for example, surface acoustical wave touch screens, resistance touch screens, and capacitive touch screens.

A typical resistance touch screen apparatus includes a display screen formed by two transparent substrates, wherein there might be some transparent conductive thin films with function of conducting on the two transparent substrates. The two transparent substrates may be connected by their edges via some insulating adhesion layers. The visible area of the display screen can be controlled by users. When the first transparent substrate is touched by a stylus, a deformation occurs at the touch position and some thin films will be in contact with the other thin films at the touch position. Thus a current is formed at the touch position, thereby forming a signal. Then the touch screen apparatus can make a reaction according to the signal.

However, the two substrates are connected with their edges, such that, when a same external pressure is applied, deformations at the edges and the central area of the display are different. Thus, the performance between the edges and the central area may be different.

From another aspect, only a stylus can be used to touch the resistance touch screen apparatus, so it is a limit for convenience in controlling. Capacitive touch screens can be touched by fingers, but their structure is complex and needs a high cost.

What is needed, therefore, is a touch screen apparatus which can overcome the aforementioned disadvantages.

BRIEF DESCRIPTION OF THE DRAWINGS

Many aspects of the present touch screen apparatus can be better understood with reference to the following drawings. The components in the drawings are not necessarily drawn to scale, the emphasis instead being placed upon clearly illustrating the principles of the present touch screen apparatus. Moreover, in the drawings, like reference numerals designate corresponding parts throughout the several views.

DETAILED DESCRIPTION OF THE EMBODIMENTS

Figure 1:
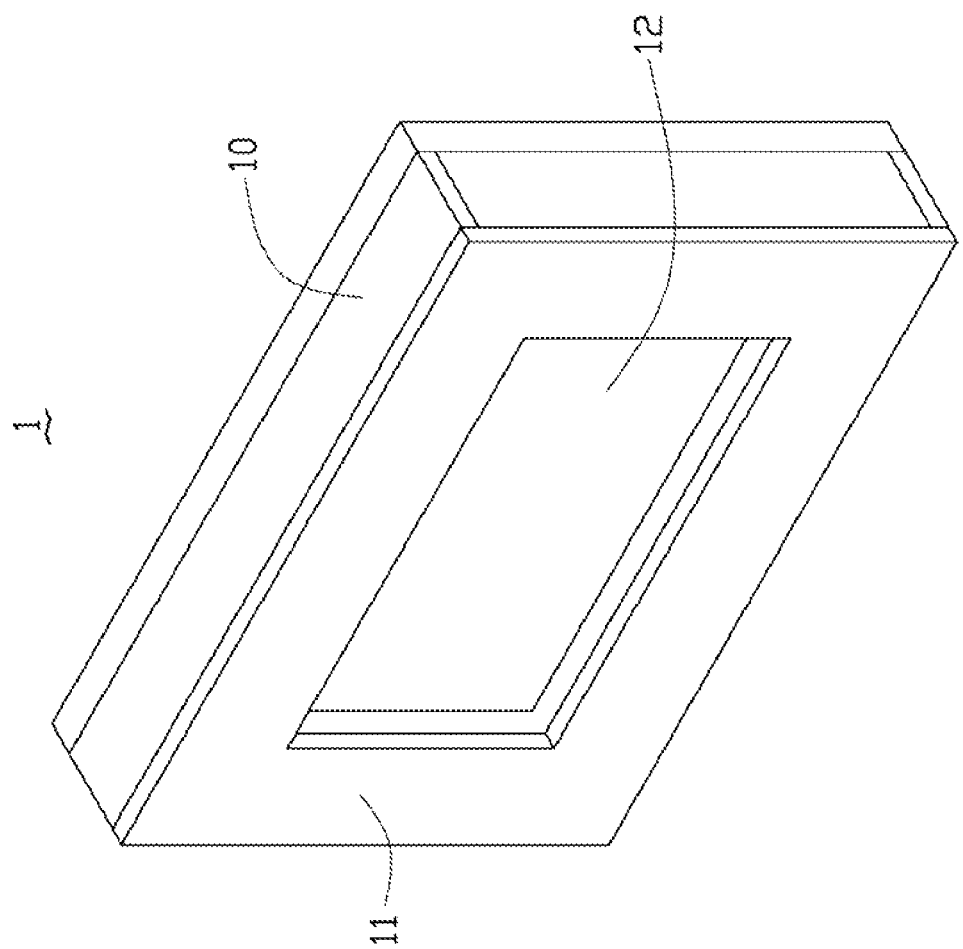
FIG. 1 is a perspective view of a touch screen apparatus in accordance with a first exemplary embodiment.

Referring to FIG. 1, a touch screen apparatus 1 in accordance with a first embodiment is shown. The touch screen apparatus 1 includes a frame 10, an upper cover 11, a display screen 12, two infrared receiving devices 16, four reflectors, and an infrared light source 20.

The display screen 12 is configured for displaying data graphics, and is mounted within the frame 10. The upper case 11 is mounted on the frame 10 and configured for covering a peripheral portion of the display screen 12. The display screen 12 is substantially rectangular. The four sides of the rectangular display screen 12 forms the contour of the display screen 12 and has a display area.

Figure 2:
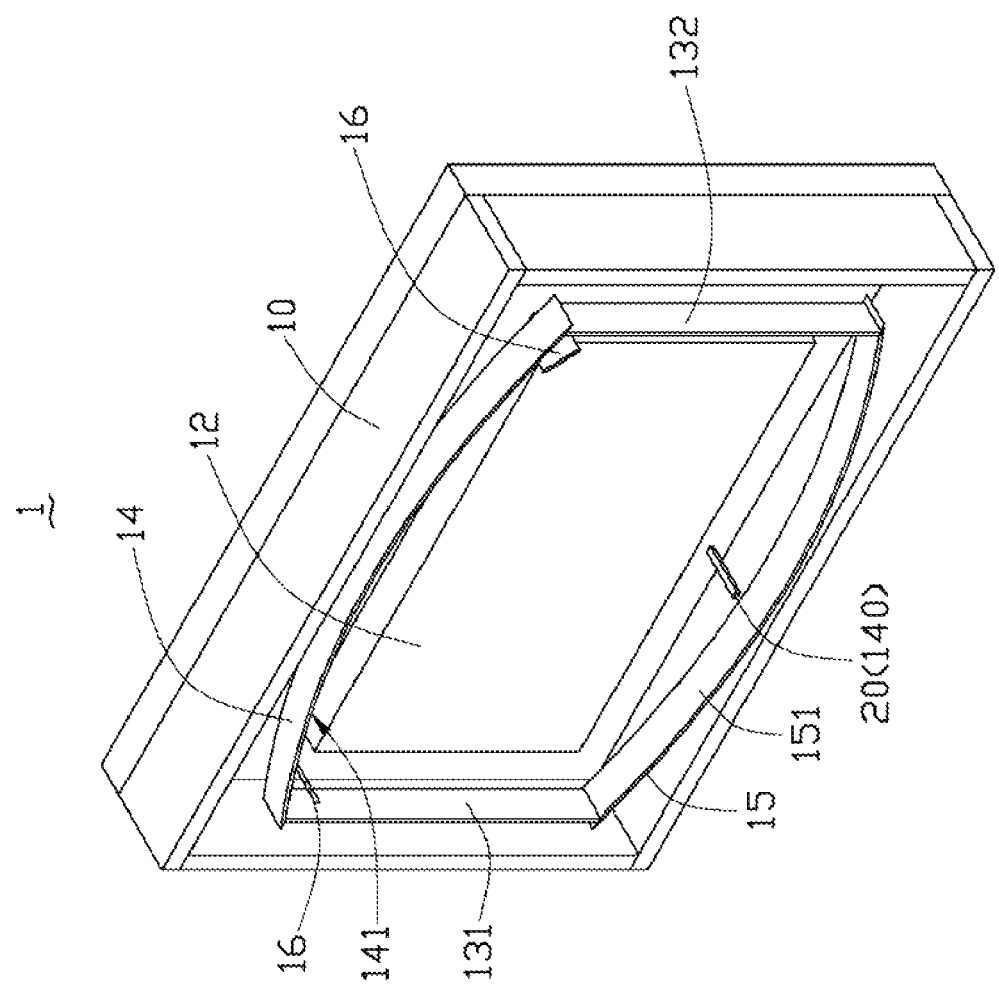
FIG. 2 is perspective view of the touch screen apparatus shown in FIG. 1 without an upper case.
Figure 3:
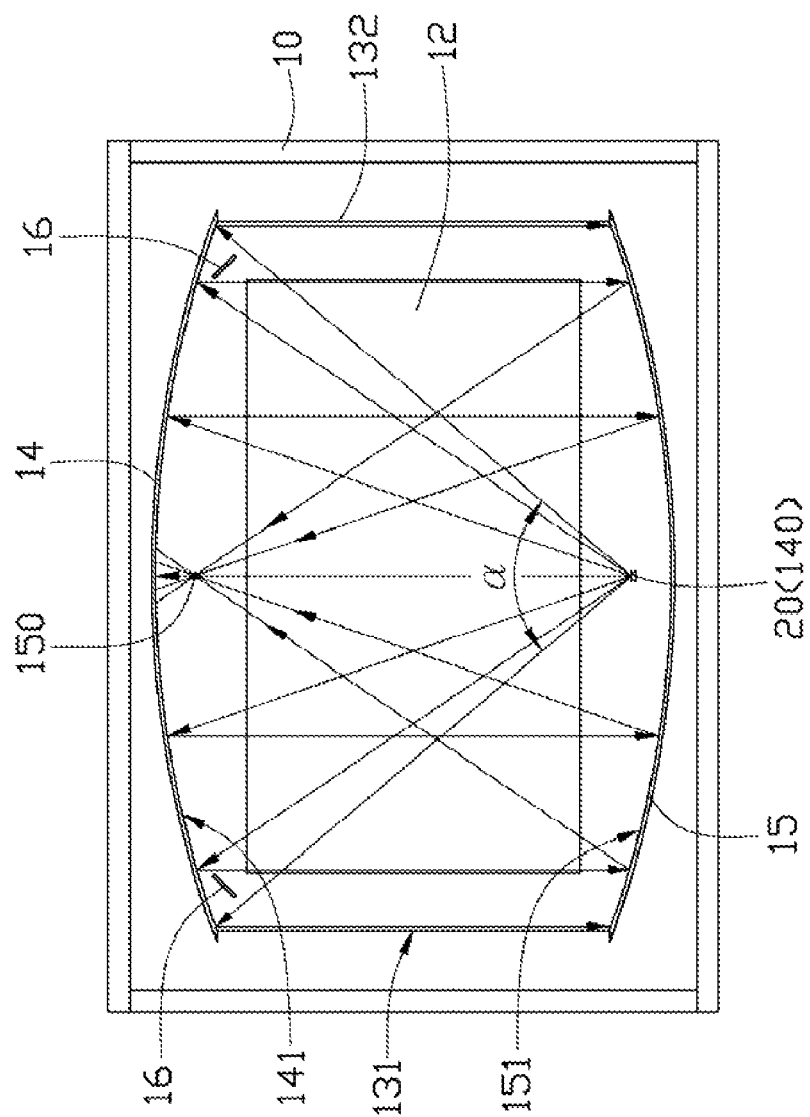
FIG. 3 is a plan view of the touch screen apparatus shown in FIG. 2, wherein essential light paths are shown.

Referring to FIGS. 2 and 3, the touch screen apparatus 1 without the upper case 11 exposing its inner structure is depicted. Surrounding the four sides of the display screen 12 are four reflectors, including a first flat mirror 131, a second flat mirror 132, a first parabolic reflector 14, and a second parabolic reflector 15.

The first flat mirror 131 and the second flat mirror 132 are respectively located at a left side and a right side of the display screen 12 relative to a viewer. The first flat mirror 131 is parallel to the second flat mirror 132. The length of the first flat mirror 131 and the second flat mirror 132 is longer than the length of the left side and the right side of the display screen 12 respectively.

The first parabolic reflector 14 and the second parabolic reflector 15 are respectively located at an upper side and a lower side of the display screen 12 relative to a viewer. The span of the first parabolic reflector 14 and the second parabolic reflector 15 are longer than the length of the upper side and the lower side respectively. The first parabolic reflector 14 has a first parabolic reflective surface 141, and the second parabolic 15 has a second parabolic reflective surface 151. The first parabolic reflector 14 is opposite to the second parabolic reflector 15. That is, the first reflective surface 141 and the second reflective surface 151 face each other.

The first parabolic reflector 14 has a first focal point 140 between the second parabolic reflector 15 and the lower side of the display screen 12. Preferably, the first focal point 140 lies at the center of the lower side of the display screen 12. The first focal point 140 can also lie on the center point of the second parabolic reflective surface 151.

The second parabolic reflector 15 has a second focal point 150 between the first parabolic reflector 14 and the upper side of the display screen 12. Preferably, the second focal point 150 is located at the center of the upper side of the display screen 12. The second focal point 150 also lies on the center point of the first parabolic reflective surface 141.

An infrared light source 20 is disposed on the first focal point 140. The infrared light source 20 can be selected from infrared laser(s) or infrared light emitting diode(s).

Infrared light emitted by the infrared light source 20 is reflected by the first parabolic reflector 14. The reflected light from the first parabolic reflector 14 is parallel to each other and is directed towards the second parabolic reflector 15. The parallel infrared light is then reflected by the second parabolic reflector 15 to focus on the second focal point 150 and then goes toward the first parabolic reflective surface 141. Some parallel infrared light is reflected by the first flat mirror 131 and the second flat mirror 132. Infrared light is reflected back and forth repeatedly between the first parabolic reflector 14, the second parabolic reflector 15, the first flat mirror 131, and the second flat mirror 132 such that the display screen 12 is uniformly covered by infrared light.

Preferably, a second infrared light source is located at the second focal point 150 in order to strengthen the density of infrared light rays above the display screen 12.

Preferably, the angle of radiation of the infrared light source 20 is not less than the angle α of the first parabolic reflector 14. For example, if the angle α of the first parabolic reflector 14 is 80 degrees, and the angle of radiation of the infrared light source 20 can be for example 85 degrees.

At least one infrared light receiving unit 16 is mounted outside the displaying area 12 and within the frame 10. The infrared light receiving unit 16 is configured for receiving the infrared light rays in the range of the display screen 12. Under normal conditions, the infrared light receiving unit 16 is capable of receiving all infrared light covering the display area. When infrared light at some point(s) is obstructed by an opaque object (not shown), the output current of the infrared light receiving unit 16 changes. This change will be calculated by the touch screen apparatus 1 to obtain the position(s) of the point(s). The opaque object can be a finger or a stylus.

One more infrared light receiving unit 16 strengthen the sensitivity of the touch screen apparatus 1. The two infrared light receiving units 16 are located at a first corner formed by the first parabolic reflector 14 and the first flat mirror 131, and a second corner formed by the first parabolic reflector 14 and the second flat mirror 132, respectively.

The infrared light receiving units 16 may be an infrared receiver or an infrared camera module.

The accuracy of the touch screen apparatus 1 is controlled mainly by the uniformity of the infrared light rays in the range of the display screen 12. Infrared light reflected a number of times between the four reflectors create uniformly distributed infrared light in the display area.

Alternatively, it is also workable to put the first flat mirror 131 at the upper side, the second flat mirror 132 down side, the first parabolic reflector 14 left side, and the second parabolic reflector 15 right side. Nonetheless, one infrared light source is still located at a focal point of a parabolic reflector.

Alternatively, the two infrared light receiving units 16 can also be mounted diagonally outside the display screen 12.

Figure 4:
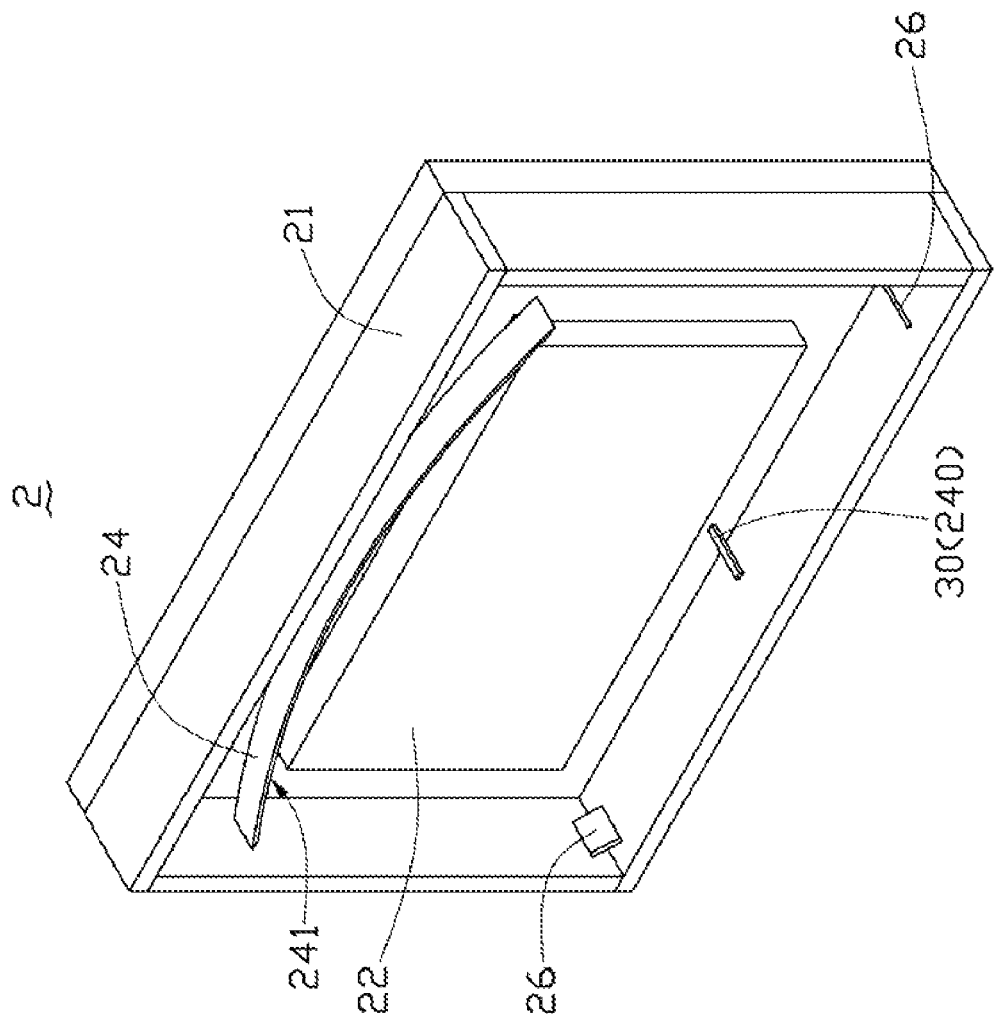
FIG. 4 is a perspective view of a touch screen apparatus in accordance with a second exemplary embodiment.

Referring to the FIG. 4, the second embodiment provides a touch screen apparatus 2 without an upper case including a frame 21, a display screen 22, a concave mirror 24, at least one infrared receiving device 26, and an infrared light source 30.

The display screen 22 is substantially rectangular. The concave mirror 24 has a concave spherical reflecting surface 241. The concave mirror 24 is disposed outside the display screen 22 and surrounds the upper side of the display screen 22 relative to a viewer. The concave mirror 24 has a focal point 240. The position of the focal point 240 lies at the down side of the display screen 22 and slightly above the top surface of the display area. An infrared light source 30 is mounted at the focal point 240. The infrared light source 30 can include infrared laser(s) or infrared light emitting diode(s). Infrared light emitted by the infrared light source 30 are reflected by the concave mirror 24 to parallel to and cover the display area.

At least one infrared camera 26 is disposed outside the display screen 22 to receive the infrared light emitted by the infrared light source 30. For example, two infrared cameras 26 are disposed opposite to each other at the down side of the display screen 22. Alternatively, the two infrared cameras 26 can also be put diagonally outside the display screen 22. The two infrared cameras 26 are used to detect the position of an opaque object being touched therewith.

For the touch screen apparatus 2, one concave mirror 24 is enough to make the infrared light rays distributed in the range of the display screen 22 uniformly.

Figure 5:
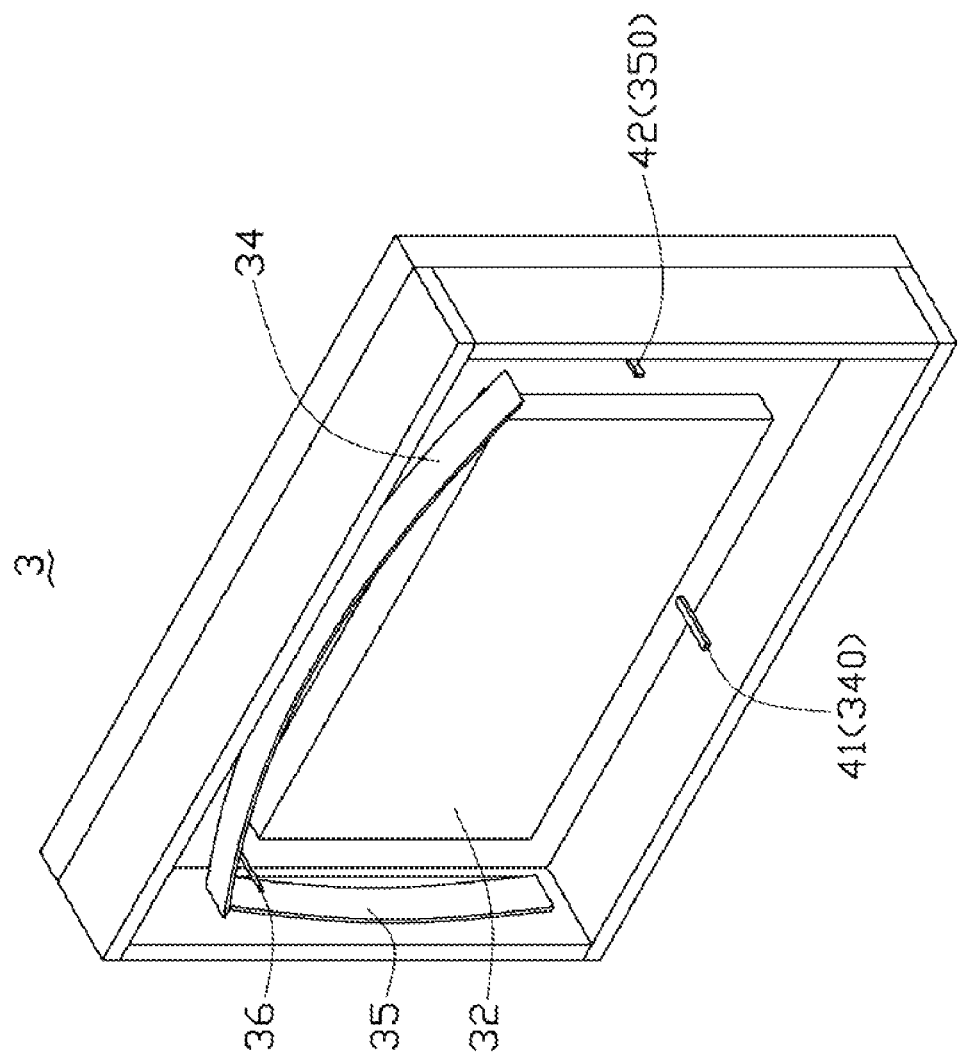
FIG. 5 is a perspective view of a touch screen apparatus in accordance with a third exemplary embodiment.

Referring to FIG. 5, the third embodiment provides a touch screen apparatus 3. The touch screen apparatus 3 includes a display screen 32, a first parabolic reflector 34 and a second parabolic reflector 35 adjacent to the first parabolic reflector 34. The display screen 32 is substantially rectangular. The first parabolic reflector 34 surrounds the upper side of the display screen 32, and the second parabolic reflector 35 is disposed on the left side of the display screen 32. That is, the first parabolic reflector 34 and the second parabolic reflector 35 are substantially perpendicular to each other. The first parabolic reflector 34 has a first focal point 340. The second parabolic reflector 25 has a second focal point 350. A first infrared light source 41 is disposed on the first focal point 340 of the first parabolic reflector 34. A second infrared light source 42 is disposed on the second focal point 350 of the second parabolic reflector 35. An infrared light receiving unit 36 is disposed on the corner formed by the first parabolic reflector 34 and the second parabolic reflector 35 in order to receive the infrared light emitted by the first light source 41 and the second light source 42.

The other sides of the display screen 32 can be mounted with one or two flat mirrors, or set with one or two parabolic reflectors, or set with one or two concave mirrors. One more infrared light source can also be added to the touch screen apparatus 3 at a focal point of any reflector, for example, a parabolic reflector, or a concave mirror, and so on.

Figure 6:
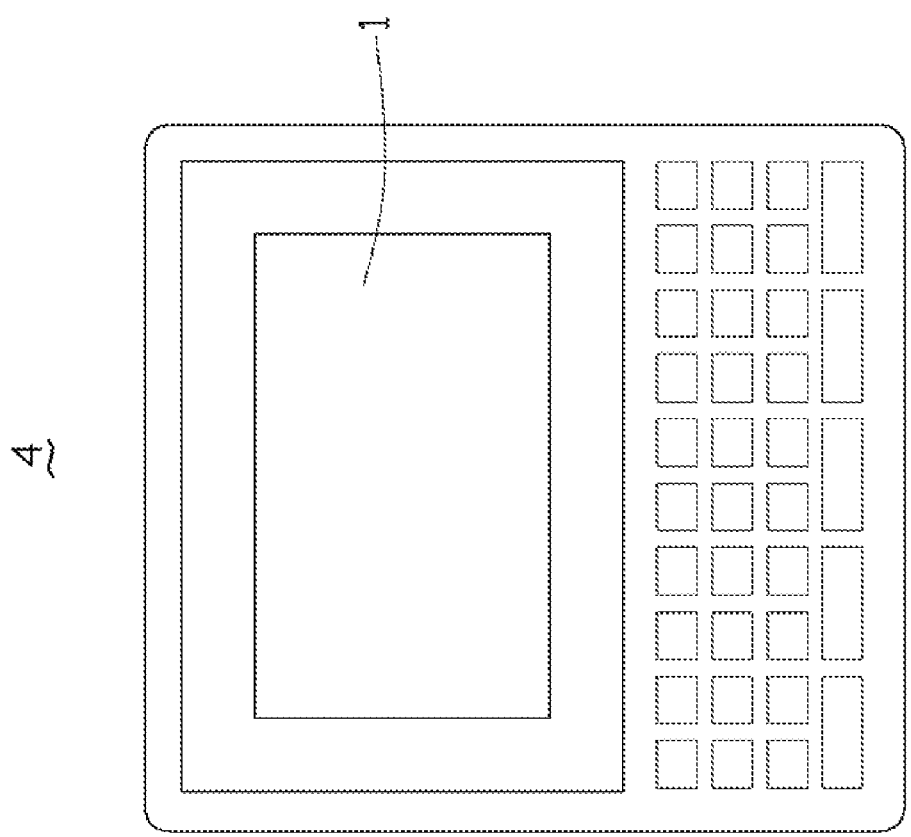
FIG. 6 is a plan view of a mobile phone comprising a touch screen apparatus of the first exemplary embodiment.

FIG. 6 illustrates a mobile phone 4 according to a fourth embodiment. The mobile phone 4 includes the touch screen apparatus 1, and the mobile phone 4 can be controlled by touching the touch screen apparatus 1 or press the conventional keyboard 50 of the mobile phone 4.

Other input devices can also employ said the touch screen apparatus, such as, for example, an MP3, a notebook, or a personal computer.

It is also possible that the display screen in any embodiment is not rectangular but polygonal or round. The point is to set enough reflectors to make the infrared light rays uniformly cover the display screen.

It is understood that the above-described embodiments are intended to illustrate rather than limit the embodiments. Variations may be made to the embodiments without departing from the spirit of the invention. Accordingly, it is appropriate that the appended claims be construed broadly and in a manner consistent with the scope of the embodiments.

What is claimed is:

1. A touch screen apparatus comprising:
   a display screen comprising a display area,
   a first reflector being a parabolic reflector and having a first focal point, the first reflector disposed outside said display screen and surrounding said display area,
   a second reflector being a parabolic reflector and having a second focal point, the second reflector disposed outside said display screen and surrounding said display area, the second reflector being opposite to said first reflector,
   a first infrared light source positioned between the first reflector and the second reflector, and disposed on said first focal point, the first parabolic reflector reflecting an infrared light emitted by the first infrared light source into a parallel infrared light, and the parallel infrared light being reflected by the second parabolic reflector to focus on the second focal point, and
   an infrared light receiving unit capable of receiving said infrared light in the area of said display screen.

2. The touch screen apparatus according to claim 1, wherein said first reflector is a concave mirror.

3. The touch screen apparatus according to claim 1, further comprising a second infrared light source, wherein said infrared light source is disposed on said second focal point.

4. The touch screen apparatus according to claim 1, further comprising a third reflector, wherein said third reflector is disposed outside said display screen and between said first reflector and said second reflector.

5. The touch screen apparatus according to claim 4, wherein said third reflector is a flat mirror.

6. The touch screen apparatus according to claim 4, further comprising a fourth reflector, wherein said fourth reflector is outside said display screen and opposite to said third reflector.

7. The touch screen apparatus according to claim 6, wherein said infrared light receiving unit comprises two infrared light cameras, said infrared light cameras are respectively mounted at a corner formed by the first reflector and the third reflector, and a corner formed by the second reflector and the fourth reflector.

8. The touch screen apparatus according to claim 1, further comprising a frame and an upper case, wherein said upper case is mounted on said frame configured for covering a peripheral portion of said display screen, said first reflector, said second reflector, said first infrared light source, and said infrared light receiving unit.

* * * * *